United States Patent
Kliesch et al.

(10) Patent No.: US 7,229,697 B2
(45) Date of Patent: *Jun. 12, 2007

(54) HYDROLYSIS-STABLE FILM COMPRISING A POLYESTER WITH A HYDROLYSIS STABILIZER AND PROCESS FOR ITS PRODUCTION AND ITS USE

(75) Inventors: Holger Kliesch, Ginsheim-Gustavsburg (DE); Bodo Kuhmann, Runkel (DE); Thorsten Kiehne, Shiga (JP); Ingo Fischer, Heistenbach (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/222,266

(22) Filed: Sep. 8, 2005

(65) Prior Publication Data
US 2006/0057409 A1    Mar. 16, 2006

(30) Foreign Application Priority Data
Sep. 10, 2004 (DE) .................. 10 2004 044 326

(51) Int. Cl.
*B32B 27/18* (2006.01)
*B32B 27/36* (2006.01)
*C08K 5/151* (2006.01)
*C08K 5/1515* (2006.01)

(52) U.S. Cl. .................. 428/480; 428/323; 428/910; 264/288.4; 264/290.2; 524/114

(58) Field of Classification Search ............ None
See application file for complete search history.

(56) References Cited

U.S. PATENT DOCUMENTS

| | | | |
|---|---|---|---|
| 3,657,191 A | | 4/1972 | Titzmann et al. ......... 260/75 T |
| 3,886,104 A | * | 5/1975 | Borman et al. ............. 524/114 |
| 4,220,568 A | * | 9/1980 | Patzschke ................ 528/295.3 |
| 4,390,688 A | * | 6/1983 | Walz et al. ............... 528/295.3 |
| 4,540,729 A | * | 9/1985 | Williams .................... 524/114 |
| 5,270,390 A | * | 12/1993 | Shibuya et al. ............. 525/173 |
| 5,534,570 A | * | 7/1996 | Shih et al. .................. 524/114 |
| 5,563,222 A | * | 10/1996 | Fukuda et al. .............. 525/437 |
| 5,589,126 A | * | 12/1996 | Shih et al. .................. 264/211 |
| 5,824,398 A | * | 10/1998 | Shih ....................... 428/195.1 |

(Continued)

FOREIGN PATENT DOCUMENTS

CH    621 135 A5    1/1981

(Continued)

OTHER PUBLICATIONS

Schimtz, Peter et al., "Films." Ullmann's Encyclopedia of Industrial Chemistry, 5th Ed., vol. A11 (1988), pp. 85-95, 105-106, 108-110.*

*Primary Examiner*—Vivian Chen
(74) *Attorney, Agent, or Firm*—ProPat, L.L.C.

(57) ABSTRACT

The invention relates to a hydrolysis-stable polyester film comprising a polyester, whose thickness is preferably in the range from 0.4 to 500 μm. The film comprises polyester and at least one hydrolysis stabilizer and is distinguished by its low hydrolysis rate. The invention furthermore relates to a process for the production of the film and its use.

15 Claims, 1 Drawing Sheet

U.S. PATENT DOCUMENTS

| | | | |
|---|---|---|---|
| 5,885,709 A | 3/1999 | Wick et al. | 428/364 |
| 6,306,494 B1 * | 10/2001 | Takahashi et al. | 428/328 |
| 2001/0018476 A1 * | 8/2001 | Murschall et al. | 524/86 |
| 2002/0065346 A1 * | 5/2002 | Murschall et al. | 524/323 |
| 2003/0171465 A1 * | 9/2003 | Kliesch et al. | 524/127 |
| 2003/0219614 A1 * | 11/2003 | Kliesch et al. | 428/523 |
| 2005/0137299 A1 * | 6/2005 | Berndt | 524/114 |
| 2006/0057408 A1 * | 3/2006 | Kliesch et al. | 428/480 |

FOREIGN PATENT DOCUMENTS

| | | |
|---|---|---|
| DE | 103 04 341 A1 * | 8/2004 |
| DE | 10304341 A1 * | 8/2004 |
| DE | 103 49 168 A1 * | 6/2005 |
| DE | 10349168 A1 * | 6/2005 |
| EP | 0 292 251 A2 | 11/1988 |
| EP | 0 838 500 A2 | 4/1998 |
| EP | 1 371 681 A2 | 12/2003 |
| WO | WO 2004/069912 A1 | 8/2004 |

* cited by examiner

HYDROLYSIS-STABLE FILM COMPRISING A POLYESTER WITH A HYDROLYSIS STABILIZER AND PROCESS FOR ITS PRODUCTION AND ITS USE

CROSS-REFERENCE TO RELATED APPLICATIONS

This application claims priority to German parent application 10 2004 044 326.2 which is hereby incorporated by reference herein in its entirety.

FIELD OF THE INVENTION

The invention relates to a hydrolysis-stable film comprising a polyester, whose thickness is in the range from 0.4 to 500 µm. The film comprises at least one hydrolysis stabilizer and is distinguished by its low hydrolysis rate. The invention furthermore relates to a process for the production of the film and its use.

BACKGROUND OF THE INVENTION

Films comprising polyesters in the stated thickness range are sufficiently well known. The disadvantage of such polyester films, however, is their tendency to hydrolyze, in particular at temperatures above the glass transition temperature of the respective polyester. Here, tendency to hydrolyze is understood as meaning the property of the polyester to undergo hydrolytic degradation under humid conditions, which is evident, for example, from a reduction of the IV or SV value. This is a limiting factor for the use of polyester films, particularly in applications with a relatively high thermal load, such as in film capacitors, cable sheathing, ribbon cables or engine-protection films, but also in long-term applications, such as in glazing and outdoor applications.

The tendency to hydrolyze is particularly pronounced in the case of aliphatic polyesters, but also in the case of aromatic polyesters, such as PBT and PET. If the tendency of PET to hydrolyze becomes too great for the application, it is necessary to rely on the somewhat more hydrolysis-stable PEN or even on other polymers, such as, for example, polyetherimides or polyimides. However, these are substantially more expensive than PET and, for economic reasons, are therefore often not a solution.

It has therefore already been proposed to improve the hydrolysis stability of polyester films by incorporating hydrolysis stabilizers.

The more hydrolysis-stable polyester raw materials which are obtained by using carbodiimides, and fibers and films produced therefrom, are known (U.S. Pat. No. 5,885,709, EP-A-0 838 500, CH-A-621 135). However, films which are produced from such raw materials tend to emit, in gaseous form, both in the production and in subsequent use, isocyanates and other byproducts and degradation products which irritate the mucous membrane or are harmful to health. This is a much greater problem in the case of sheet-like structures, such as a film having a large surface than in the case of injection-molded parts or the like.

Hydrolysis stabilizers based on epoxy groups also lead to hydrolysis stabilization and are described, for example, in EP-A-0 292 251 or U.S. Pat. No. 3,657,191. However, these compounds are based on the production of oxirane rings by means of epichlorohydrin and, inter alia owing to their terminal epoxy groups, tend to eliminate low molecular weight toxic compounds on heating, so that problems similar to those with the use of carbodiimides are associated with the use of these substances. Moreover, their incorporation into the polyester matrix is insufficient, which leads to long reaction times and, in the case of oriented polyester films, to a considerable undesired haze.

Moreover, known hydrolysis stabilizers, such as carbodiimides and other substances, such as those described in EP-A-0 292 251, have the disadvantage that in some cases they lead to considerable increases in molecular weight (increase in viscosity) in the polymer during extrusion and thus make the extrusion process unstable and difficult to control.

SUMMARY OF ADVANTAGEOUS EMBODIMENTS OF THE INVENTION

It is an object of the present invention to provide a hydrolysis-stable polyester raw material which avoids the described disadvantages of the prior art.

The object is achieved by a polyester film which, in addition to polyester, preferably comprises 0.1-20% by weight, based on the weight of the film, of a hydrolysis stabilizer based on epoxidized fatty acid alkyl esters and/or epoxidized fatty acid glycerides.

DETAILED DESCRIPTION OF ADVANTAGEOUS EMBODIMENTS OF THE INVENTION

Figure 1:
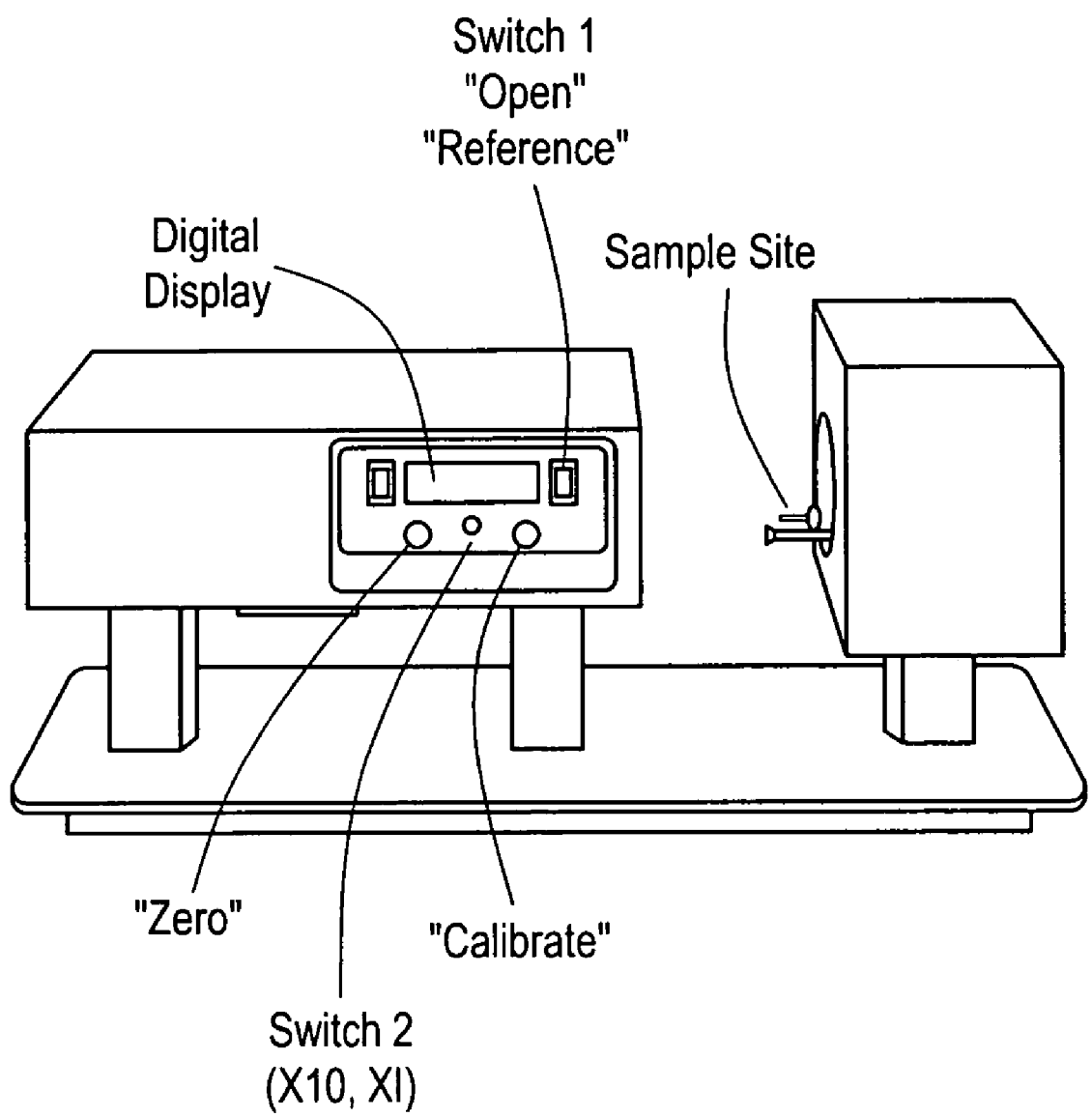
FIG. 1 is a schematic of an exemplary hazemeter which may be used to measure the haze of films in accordance with the invention.

The film comprises a polyester as the main component. Suitable polyesters are, for example, polyethylene terephthalate (PET), polyethylene naphthalate (PEN), polybutylene terephthalate (PBT), polytrimethylene terephthalate (PTT), bibenzene-modified polyethylene terephthalate (PETBB), bibenzene-modified polybutylene terephthalate (PBTBB), bibenzene-modified polyethylene naphthalate (PENBB) or mixtures thereof, PET, PBT, PEN and PPT and mixtures and copolyesters thereof being preferred.

For the preparation of the polyesters, isophthalic acid (IPA), trans- and/or cis-1,4-cyclohexanedimethanol (c-CHDM, t-CHDM or c/t-CHDM) and other suitable dicarboxylic acid components (or dicarboxylic esters) and diol components can also be used in addition to the main monomers, such as dimethyl terephthalate (DMT), ethylene glycol (EG), propylene glycol (PG), 1,4-butanediol, terephthalic acid (TA), benzenedicarboxylic acid and/or 2,6-naphthalenedicarboxylic acid (NDA).

Polymers in which the dicarboxylic acid component comprises 90% by weight (based on the total amount of the dicarboxylic acid component) or more, in particular 95% by weight or more, of TA are preferred. Thermoplastics in which the diol component comprises 90% by weight or more, in particular 93% by weight (based on the total amount of the diols) or more, of EG are furthermore preferred. Polymers in which the diethylene glycol fraction, based on the total polymer, is in the range from 0.5 to 2% by weight are also preferred. The hydrolysis stabilizer is not taken into account in any of the quantity data mentioned in this paragraph.

Other suitable polyesters are aliphatic polyesters, such as polyhydroxybutyrate (PHB) and its copolymer with polyhydroxyvalerate (PHV), polyhydroxybutyrate-valerate (PHBV), poly(e-caprolactone) (PCL), SP 3/6, SP 4/6 (consisting of 1,3-propanediol/adipate or 1,4-butanediol/adipate), polycaprolactam or generally polyesters comprising adipic acid, and the esters of other aliphatic carboxylic acids.

The film according to the invention may furthermore comprise inorganic or organic particles which are required for establishing the surface topography or visual appearance. The amount of particles used is dependent on the substances used and their particle size. The latter is in general in the range from 0.01 to 30.0, preferably from 0.1 to 5.0 and in particular from 0.3 to 3.0 µm.

Suitable compounds for achieving the roughness are, for example, calcium carbonate, apatite, silica, titanium dioxide, alumina, crosslinked polystyrene, crosslinked polymethylmethacrylate (PMMA), zeolites and other silicates, such as aluminum silicates. These compounds are generally used in amounts of from 0.05 to 5% by weight, preferably from 0.1 to 0.6% by weight (based on the weight of the film).

In addition to the additives mentioned, the film may additionally comprise further components, such as flameproofing agents and/or free-radical scavengers and/or other polymers, such as polyetherimides.

The film according to the invention comprises a hydrolysis stabilizer, which is preferably metered in by means of the masterbatch technology directly during the film production, the proportion of the hydrolysis stabilizer preferably being in the range from 0.1 to 20.0% by weight, preferably from 1.0 to 6.0% by weight and particularly preferably 1.5 to 4.5% by weight, based on the weight of the crystalline thermoplastic. In the masterbatch, the proportion of the hydrolysis stabilizer is in general from 2.0 to 50.0% by weight, preferably from 4.0 to 20.0% by weight, based in each case on the total weight of the masterbatch.

Suitable hydrolysis stabilizers are epoxidized fatty acid alkyl esters and/or epoxidized fatty acid glycerides.

Preference is given here to mixtures which are composed of
a) from 90 to 10% by weight (based on the mixture) of long-chain epoxidized fatty acid alkyl esters and
b) from 10 to 90% by weight (based on the mixture) of epoxidized fatty acid glycerides.

Particularly suitable hydrolysis stabilizers are those which have an epoxy oxygen content of at least 0.5% by weight, preferably at least 1.5 and more preferably more than 2.0% by weight.

Suitable epoxidized fatty acid glycerides are, for example, epoxidized soybean oil, epoxidized linseed oil, epoxidized rapeseed oil, epoxidized sunflower oil and epoxidized fish oil (the composition of the stated oils, in particular the type and amount of the fatty acids present, is described for example in Römpp Chemie Lexikon, 10th edition, Georg Thieme Verlag, Stuttgart). Epoxidized fatty acid alkyl esters used are preferably the thermally stable 2-ethylhexyl esters of unsaturated fatty acids or fatty acid mixtures of the fatty acids on which rapeseed oil, linseed oil, soybean oil, or fish oil are based, which preferentially have epoxy contents of 1.5-15% by weight of epoxy oxygen (based on the epoxidized fatty acid alkyl esters), preferably 4-8% by weight.

To prepare the mixtures the epoxidized glycerides are mixed with the epoxidized fatty acid esters in the amounts indicated above at temperatures from 20 to 120° C., preferably at 30 to 60° C., giving liquid products.

The hydrolysis stabilizer is added to the thermoplastic of the film preferably by means of the masterbatch technology. For this purpose, it is first dispersed in a carrier material. The thermoplastic itself, for example polyethylene terephthalate or other polymers which are compatible with the thermoplastic, are suitable as carrier material. After the masterbatch has been metered into the thermoplastic for the film production, the components of the masterbatch melt during the extrusion and are thus dissolved or finely dispersed in the thermoplastic.

The preparation of the masterbatch is expediently effected by one of the two following processes:
1. The carrier material and the liquid hydrolysis stabilizer are melted in an extruder, preferably a twin-screw extruder, mixed and then extruded through a die, quenched and granulated. A process in which the carrier material (polymer) is first melted in the extruder and, after devolatilization, the liquid hydrolysis stabilizer is metered directly into the melt is preferred.
2. Addition of the hydrolysis stabilizer during preparation of the carrier material. The hydrolysis stabilizer is pumped directly into the line through which the prepared carrier material (polymer) is pumped to the dies prior to granulation. However, this method has the disadvantage that the mixing of hydrolysis stabilizer and carrier material is not as good as in method 1. Owing to the generally very high viscosity differences, metering into the reaction reactor in the preparation of the carrier material (polymer) generally leads to even poorer mixing.

If the film according to the invention comprises particles, it has proven to be advantageous if these particles are also already present in the hydrolysis stabilizer masterbatch, since particles positively influence the distribution of the hydrolysis stabilizer. It has proven to be particularly advantageous for the distribution if the carrier material comprising the hydrolysis stabilizer comprises at least 0.3, preferably more than 0.75, % by weight (based on the masterbatch) of $SiO_2$ and/or $Al_2O_3$ particles.

Furthermore, it has proven to be advantageous if a stabilizer in the form of a free-radical scavenger is added to the masterbatch (or to the polymer raw material) which comprises the hydrolysis stabilizer, since this counteracts the loss of active oxirane groups in the extrusion due to free radical secondary reactions. The film according to the invention expediently comprises such stabilizers as free-radical scavengers or heat stabilizers in amounts of from 50 to 15 000 ppm, preferably from 100 to 5000 ppm, particularly preferably from 300 to 1000 ppm, based on the weight of the film. The stabilizers added to the polyester raw materials are selected as desired from the group consisting of the primary stabilizers, such as sterically hindered phenols or secondary aromatic amines, or from the group consisting of the secondary stabilizers, such as thioethers, phosphites and phosphonites, and zinc dibutyldithiocarbamate or synergistic mixtures of primary and secondary stabilizers. The phenolic stabilizers are preferred. The phenolic stabilizers include in particular sterically hindered phenols, thiobisphenols, alkylidenebisphenols, alkylphenols, hydroxybenzyl compounds, acylaminophenols and hydroxyphenylpropionates (corresponding compounds are described, for example, in "Kunststoffadditive" [Plastics Additives], 2nd Edition, Gächter Müller, Carl Hanser-Verlag, and in "Plastics Additives Handbook", 5th Edition, Dr. Hans Zweifel, Carl Hanser-Verlag). The stabilizers having the following CAS numbers are particularly preferred: 6683-19-8, 36443-68-2, 35074-77-2, 65140-91-2, 23128-74-7, 41484-35-9, 2082-79-3 and IRGANOX® 1222 from Ciba Specialities, Basel, Switzerland, in particular embodiments the types IRGANOX® 1010, IRGANOX® 1222, IRGANOX® 1330 and IRGANOX® 1425 or mixtures thereof being preferred.

Apart from the addition of the hydrolysis stabilizer by means of the masterbatch technology, the hydrolysis stabilizer can also be added directly during film production. However, this leads to good results only if twin-screw extruders are used. Here too, the best results with regard to film quality and hydrolysis effect are obtained if the hydrolysis stabilizer is metered directly into the melt in the respective extruder after the devolatilization zone.

The film according to the invention is generally produced by extrusion processes known per se and has one or more layers, the hydrolysis stabilizer preferably being present in all layers, and embodiments in which not all layers are provided with the hydrolysis stabilizer also being possible.

In the process for producing the films according to the invention, the procedure is expediently adopted in which the corresponding melts are extruded through a flat-film die, the resultant film is drawn off and quenched in the form of a substantially amorphous prefilm on one or more roll(s) (chill roll) for solidification, the film is then reheated and biaxially stretched (oriented), and the biaxially stretched film is heat-set. In the region of the extrusion, it has proven to be advantageous if temperatures of 295° C. are not exceeded. It is particularly advantageous if the region of the die and especially the region of the die lip and the immediate vicinity is not warmer than 290° C., preferably not warmer than 285° C. and particularly preferably not warmer than 275° C.

The biaxial stretching is generally carried out sequentially. Preferably, stretching is effected first in the longitudinal direction (i.e. in the machine direction=MD) and then in the transverse direction (i.e. perpendicular to the machine direction=TD). This leads to an orientation of the molecular chains. The stretching in the longitudinal direction can be carried out with the aid of two rolls running at different speeds according to the intended stretching ratio. For the transverse stretching, a corresponding tenter frame is generally used.

The temperature at which the stretching is carried out can vary within a relatively large range and depends on the desired properties of the film. In general, the longitudinal and also the transverse stretching is carried at $T_g+10°$ C. to $T_g+60°$ C. ($T_g$=glass transition temperature of the film). The longitudinal stretching ratio is in general in the range from 2.0:1 to 6.0:1, preferably from 3.0:1 to 4.5:1. The transverse stretching ratio is in general in the range from 2.0:1 to 5.0:1, preferably from 3.0:1 to 4.5:1, and that of the optionally performed second longitudinal and transverse stretching is from 1.1:1 to 5.0:1.

The first longitudinal stretching can optionally be carried out simultaneously with the transverse stretching (simultaneous stretching). It has proven to be particularly advantageous if the stretching ratio in the longitudinal and transverse directions is in each case greater than 3.0.

In the subsequent heat-setting, the film is kept at a temperature of from 150° C. to 260° C., preferably from 200 to 245° C., for about 0.1 to 10 s. After the heat-setting or beginning therein, the film is relaxed by from 0 to 15%, preferably by from 1.5 to 8%, in the transverse and optionally also in the longitudinal direction, and the film is cooled and wound in a conventional manner.

A film produced in this manner has substantially less tendency to hydrolyze both at room temperature and at temperatures up to 210° C. than an unmodified polyester film. The stabilization is substantially independent of the film thickness and the temperature in a measuring range of 25 to 210° C. Thus, for example, a 12 µm thick single-layer PET film (DEG content 1% by weight and initial SV value of 720) comprising 2% by weight of a hydrolysis stabilizer mixture comprising one part epoxidized soybean oil having an epoxide oxygen content of 6.3% by weight and one part epoxidized stearic acid 2-ethylhexyl ester having an epoxide oxygen content of 4.5% by weight (epoxide oxygen content of the mixture 5.3% by weight) still has an SV value of above 500 after 96 h in an autoclave with water vapor saturation and at 110° C. and is therefore still mechanically stable, whereas an unstabilized film has already decreased below SV 400 after this time and therefore has virtually no flexural strength. The stabilized film withstands said conditions for 50% longer before it reaches the critical limit of 400 SV units. The same relative time gain is also found at 80° C. and at 170° C.

It was particularly surprising that, in spite of the good long-term stabilization to hydrolysis, no undesired increase in viscosity in the extruder was found and no increased gel or speck level was observed in the film production.

Films which are stabilized by means of said hydrolysis stabilizers are outstandingly suitable for the production of products which comprise polyester films and are designed either for a long life (more than 1 year) or which are subjected to relatively high temperatures (greater than 80° C.), in particular at high humidity, during their use, or for outdoor applications.

Thus, they are outstandingly suitable for the production of film capacitors (preferred thickness range 0.4-12 µm). These can be produced by the known conventional methods and process sequences (inter alia, metallization, assembly, winding, Schoop process, contacting, potting, etc.) and have a substantially longer life compared with the conventional polyester film capacitors and, in contrast to capacitors already described and comprising carbodiimide stabilizers, do not lead to the emission of isocyanates harmful to health, even on strong heating. For the production of capacitors, it has proven to be advantageous if the film have a longitudinal shrinkage of less than 4% and a transverse shrinkage of less than 1% at 200° C., since they are then particularly suitable for the production of SMD capacitors. The films according to the invention have such low shrinkage values.

For example, ribbon cables in automobiles constitute a further application. For this purpose, films (preferably 12-200 µm) are laminated with copper by means of a heat-seal adhesive (e.g. EKP heat-seal lacquer 230 from EKP Verpackungslacke GmbH (Germany)). Composites which comprise polyester with hydrolysis stabilizer withstand the mechanical loads (including vibrations) occurring in automobiles for much longer than composites comprising conventional polyester films. However, it should be ensured here that the adhesives, too, are substantially insensitive to hydrolysis (in the case of polyester-based adhesives, treatment with said hydrolysis stabilizers is advisable).

In the following embodiments, the measurement of the individual properties is effected according to the stated standards or methods.

Methods of Measurement

Standard Viscosity (SV)

The standard viscosity SV is measured—based on DIN 53726—by the measurement of the relative viscosity $\eta_{rel.}$ of a 1% strength by weight solution in dichloroacetic acid (DCA) in an Ubbelohde viscometer at 25° C. The SV value is defined as follows:

$$SV=(\eta_{rel.}-1)\cdot 1000$$

Roughness

The roughness Ra of the film is determined according to DIN 4768 at a cut-off of 0.25 mm.

Shrinkage

The thermal shrinkage was determined using square film samples having an edge length of 10 cm. The samples are cut out so that one edge is parallel to the machine direction and one edge is perpendicular to the machine direction. The samples are measured exactly (the edge length $L_0$ is determined for each machine direction TD and MD, $L_{0\ TD}$ and $L_{0\ MD}$) and are heated for 15 min at the stated shrinkage temperature (200° C. here) in a forced-circulation drying oven. The samples are removed and are exactly measured at room temperature (edge length $L_{TD}$ and $L_{MD}$) The shrinkage is obtained from the equation Shrinkage [%]$MD = 100 \cdot (L_{0\ MD} - L_{MD})/L_{0\ MD}$ Shrinkage [%]$TD = 100 \cdot (L_{0\ TD} - L_{TD})/L_{0\ TD}$ Measurement of the Haze The measurement is effected using the Hazegard hazemeter XL-211 from BYK Gardner. The measuring apparatus is switched on 30 min before the measurement. It should be ensured that the light beam passes through the sphere concentrically with the outlet aperture.

Production, Shape and Number of Samples 5 samples each, having a size of 100 by 100 mm, are cut out from the film to be investigated. The longitudinal direction and transverse direction are marked on the edge since the measurements are effected in both machine directions.

Measurement of the Haze

Press switch 1 "OPEN"

Set switch 2 to "X10" and calibrate digital display to 0.00 using the "Zero" button Switch over switch 1 to "Reference" and switch 2 to "X1"

Using the "Calibrate" button, bring the digital display to 100

Place sample in longitudinal direction

Read display value for the transparency

Calibrate the digital display to 100 using the "Calibrate" button

Set switch 1 to "OPEN"

Read display value for the haze in the longitudinal direction

Turn sample into transverse direction

Read display value for the haze in the transverse direction

Evaluation

The haze is obtained by averaging the respective 5 individual values (longitudinal and transverse).

Autoclaving

The films (10·2 cm) are suspended from a wire in the autoclave (Adolf Wolf SANOklav type ST-MCS-204), and the autoclave is filled with 2 l of water. After being closed, the autoclave is heated. At 100° C., the air is displaced by the steam via the discharge valve. This is closed after about 5 min, after which the temperature increases to 110° C. and the pressure to 1.5 bar. After 24 h, the autoclave is automatically switched off, and the films are removed after the discharge valve has been opened. The SV value of said films is then determined.

EXAMPLES

Hydrolysis Stabilizer 1

A steel reactor equipped with an internal thermometer was charged at room temperature with 10 kg of epoxidized soybean oil having an epoxy oxygen content of 6.3% by weight, to which 10 kg of epoxidized stearic acid 2-ethylhexyl ester having an epoxy oxygen content of 4.5% by weight were added, after which the mixture was stirred at 25° C. over the course of 30 minutes to give a clear, homogeneous solution. The epoxy oxygen content thereafter is 5.3% by weight.

Hydrolysis Stabilizer 2

A steel reactor equipped with an internal thermometer was charged at room temperature with 15 kg of epoxidized linseed oil having an epoxy oxygen content of 9.1% by weight, to which 5 kg of epoxidized stearic acid 2-ethylhexyl ester having an epoxy oxygen content of 4.5% by weight were added, after which the mixture was stirred at 45° C. over the course of 30 minutes to give a clear, homogeneous solution. The epoxy oxygen content of the mixture thereafter is 7.2% by weight.

Hydrolysis Stabilizer 3

Epoxidized linseed oil having an epoxy oxygen content of 9.1% by weight, with 2% by weight of Irganox 1010.

Preparation of Raw Materials (Polymers Stabilized to Hydrolysis)

PET Comprising Hydrolysis Stabilizer 1

A polyethylene terephthalate raw material comprising 10 000 ppm of Sylobloc 44H (Grace) and 5000 ppm of Aerosil TT600 (Degussa) and 3000 ppm of Irganox 1010 (Ciba) and a DEG content of 1% is melted in a twin-screw extruder from Coperion and mixed with 8% by weight of hydrolysis stabilizer 1. Hydrolysis stabilizer 1 was metered by means of a pump directly into the melt after the devolatilization zone. SV value 790.

PET Comprising Hydrolysis Stabilizer 2

Polyethylene terephthalate raw material RT49 (R1) from Invista was melted in a twin-screw extruder from Coperion and mixed with 4% by weight of hydrolysis stabilizer 2. Hydrolysis stabilizer 2 was metered by means of a pump directly into the melt after the devolatilization zone. SV value 790.

PET Comprising Hydrolysis Stabilizer 3

Polyethylene terephthalate raw material RT49 (R1) from Invista was melted in a twin-screw extruder from Coperion and mixed with 4% by weight of hydrolysis stabilizer 3. Hydrolysis stabilizer 3 was metered by means of a pump directly into the melt after the devolatilization zone. SV value 790.

Further Raw Materials Used

Raw material R1 PET (type RT49, Invista Germany), SV value 790

Masterbatch MB1 1.0% by weight of Sylobloc 44H, 0.50% of Aerosil TT600 and 98.5% by weight of PET; SV value 790; DEG content of 1% by weight Film Production (Capacitor Film) Process 1:

Thermoplastic chips were mixed according to the ratios stated in the examples and were precrystallized in a fluidized-bed drier at 155° C. for 1 min, then dried for 3 h in a shaft drier at 150° C. and extruded at 278° C. The molten polymer was taken off from a die via a take-off roll. The thickness of this prefilm was 29 µm. The film was stretched by a factor of 3.8 in the machine direction at 116° C., and transverse stretching by a factor of 3.7 was carried out in a frame at 110° C. Thereafter, the film was heat-set at 230° C. and relaxed in the transverse direction by 8% at temperatures of 200-180° C. The final film thickness was 2 µm.

Film Production for Ribbon Cable Process 2:

Thermoplastic chips were mixed according to the ratios stated in the examples and extruded at 278° C. in a twin-screw extruder (JapanSteelWorks). The molten polymer was taken off from a die via a take-off roll. The thickness of this prefilm was 530 µm. The film was stretched by a factor of 3.4 in the machine direction at 116° C., and transverse stretching by a factor of 3.1 was carried out in a frame at 110° C. Thereafter, the film was heat-set at 225° C. and relaxed in the transverse direction by 3% at temperatures of 200 to 180° C. The final film thickness was 50 µm.

The properties of the films produced are shown in the table below.

TABLE

|  |  | Example 1 | Example 2 | Example 3 | Example 4 | Comparative example 1 | Comparative example 2 |
|---|---|---|---|---|---|---|---|
| PET with hydrolysis stabilizer 1 | in % by weight | 25 |  |  | 25 |  |  |
| PET with hydrolysis stabilizer 2 | in % by weight |  | 90 |  |  |  |  |
| PET with hydrolysis stabilizer 3 | in % by weight |  |  | 90 |  |  |  |
| R1 | in % by weight | 75 |  | 75 |  | 75 | 90 |
| MB1 | in % by weight |  | 10 |  | 10 | 25 | 10 |
| Process | No. | 1 | 2 | 2 | 2 | 1 | 2 |
| Film thickness | in µm | 2 | 50 | 50 | 50 | 2 | 50 |
| Ra value | in nm | 85 | 90 | 125 | 93 | 82 | 97 |
| SV value |  | 765 | 785 | 788 | 784 | 763 | 787 |
| SV value after 96 h at 110° C. in an autoclave with water saturation |  | 505 | 530 | 511 | 500 | 391 | 399 |

The invention claimed is:

1. A biaxially oriented polyester film comprising polyester and a hydrolysis stabilizer comprising an effective amount of a mixture of epoxidized fatty acid alkyl esters and epoxidized fatty acid glycerides, said film retaining a higher solution viscosity value after 96 hours at 110° C. in an autoclave with water saturation than a comparable film formed with said effective amount of said epoxidized fatty acid glyceride alone.

2. The polyester film as claimed in claim 1, wherein said film is a single- or multilayer film.

3. The polyester film as claimed in claim 2, wherein said film is a multilayer film.

4. The polyester film as claimed in claim 3, wherein the hydrolysis stabilizer is present in all of the layers of the multilayer film.

5. The polyester film as claimed in claim 1, which comprises organic or inorganic particles.

6. The polyester film as claimed in claim 1, which comprises flame retardant and/or free-radical scavenger.

7. The polyester film as claimed in claim 1, wherein from 0.1 to 20.0% by weight, based on the weight of the film, of hydrolysis stabilizer is present.

8. The polyester film as claimed in claim 1, wherein the hydrolysis stabilizer is a mixture comprising
   (a) from 90 to 10% by weight, based on the mixture, of epoxidized fatty acid alkyl esters and
   (b) from 10 to 90% by weight, based on the mixture, of epoxidized fatty acid glycerides.

9. The polyester film as claimed in claim 1, wherein the hydrolysis stabilizer has an epoxy oxygen content of at least 0.5% by weight.

10. The polyester film as claimed in claim 1, wherein the epoxidized fatty acid glycerides have been selected from one or more of the following substances: epoxidized soybean oil, epoxidized linseed oil, epoxidized rapeseed oil, epoxidized sunflower oil, and epoxidized fish oil.

11. The polyester film as claimed in claim 1, wherein the epoxidized fatty acid alkyl esters have been selected from one or more of the following substances: thermally stable 2-ethylhexyl esters of the unsaturated fatty acids or fatty acid mixtures of the fatty acids on which rapeseed oil, linseed oil, soybean oil, or fish oil are based.

12. The polyester film as claimed in claim 1, wherein the epoxidized fatty acid alkyl esters have epoxy oxygen contents of from 1.5 to 15% by weight of epoxy oxygen.

13. A process for production of a polyester film as claimed in claim 1, wherein a melt comprising (i) polyester and (ii) a masterbatch comprising polyester and a hydrolysis stabilizer based on epoxidized fatty acid alkyl esters and/or on epoxidized fatty acid glycerides is extruded through a flat-film die, the resultant film is drawn off and quenched in the form of a substantially amorphous prefilm on one or more rolls for solidification, the film is then reheated and biaxially stretched, and the biaxially stretched film is heat-set.

14. Film capacitors, cable sheathing, ribbon cables, or engine-protection films comprising a film according to claim 1.

15. Glazing or outdoor application film comprising a film according to claim 1.

* * * * *